United States Patent [19]

Turunc

[11] Patent Number: 5,366,637
[45] Date of Patent: Nov. 22, 1994

[54] METHOD FOR DEWATERING MUNICIPAL SOLID WASTE REFUSE

[75] Inventor: Umit Turunc, Doylestown, Pa.

[73] Assignee: Betz Laboratories, Inc., Trevose, Pa.

[21] Appl. No.: 66,836

[22] Filed: May 24, 1993

[51] Int. Cl.$^5$ .............................................. C02F 11/14
[52] U.S. Cl. .................. 210/728; 110/165 R; 106/708; 106/DIG. 1; 210/734; 210/751; 405/129
[58] Field of Search ............... 110/165 R, 165 A, 259; 106/708, DIG. 1; 210/710, 725, 727, 728, 734, 751, 901; 405/128, 129

[56] References Cited

U.S. PATENT DOCUMENTS

| | | | |
|---|---|---|---|
| 3,506,707 | 4/1970 | Miller et al. | 260/513 |
| 4,156,649 | 5/1979 | Quinn et al. | 210/51 |
| 4,286,527 | 9/1981 | Robinson et al. | 110/165 A |
| 4,342,653 | 8/1982 | Halverson | 210/734 |
| 4,411,797 | 10/1983 | Sander et al. | 210/27 |
| 4,439,351 | 3/1984 | Sinha | 252/500 |
| 4,525,280 | 6/1985 | Vasconcellos et al. | 210/728 |
| 4,726,710 | 2/1988 | Rosar et al. | 405/129 |
| 5,089,142 | 2/1992 | Turunc | 210/728 |
| 5,092,931 | 3/1992 | Fujisawa et al. | 210/728 |
| 5,256,198 | 10/1993 | Sinha | 106/DIG. 1 |

Primary Examiner—Peter A. Hruskoci
Attorney, Agent, or Firm—Alexander D. Ricci; Gregory M. Hill

[57] ABSTRACT

A method for dewatering the refuse ash generated by a municipal solid waste facility by adding to the ash a copolymer and a nonionic surfactant selected from the group consisting of primary alcohol ethoxylates, secondary alcohol ethoxylates and alkyl phenol ethoxylates. The copolymer consists of repeat units of an ethylenically unsaturated compound and an acrylamido alkane sulfonic acid compound.

6 Claims, No Drawings

METHOD FOR DEWATERING MUNICIPAL SOLID WASTE REFUSE

FIELD OF THE INVENTION

The present invention relates to the processing of municipal solid waste. Specifically, it is directed toward the removal of water from the solid waste ash prior to transport to a landfill.

BACKGROUND OF THE INVENTION

Municipal solid waste is burned in waste-to-energy (WTE) plants, also known as trash-to-steam facilities, to produce usable energy in the form of either steam or electricity. Most modern WTE plants consist of six sections: the charging chute, the furnace, the boiler, the dry scrubber, the electrostatic precipitator and the ash extractor.

Municipal solid waste is delivered to the WTE plant by trash trucks where it is either placed directly into the charging chute or it is temporarily stored in a refuse pit for delivery to the charging chute at a later time.

The solid waste is burned at combustion temperatures in the range of 1,800° F. to 2,000° F. The residue remaining after the burning of the waste is referred to as ash. The ash is deposited in an ash extractor. The hot gases generated during combustion are directed to a boiler to create the steam used to drive the generators which produce electricity. However, before these hot combustion gases can be released into the atmosphere, they must be treated to remove small particulate and gaseous ($SO_2$ etc.) combustion products. This is normally achieved by routing the gases through a dry scrubber and an electrostatic precipitator or bag house. The particulate matter which is removed from the gases at these processing units is referred to as fly ash. The fly ash is then conveyed to the ash extractor where it is mixed with the ash from the furnace.

The ash collected from the extractors can contain up to 40% moisture. Since the cost of a material deposited in a landfill is based upon its weight, the moisture content of the ash amounts to a substantial portion of disposal costs. It is therefore highly desirable to remove as much of this moisture as possible before the ash is shipped to the landfill.

An attempt is made to dewater the ash by mechanical means. A hydraulic ram pushes the moisture laden ash from the extractor up an inclined ramp. This procedure removes only a small portion of the moisture content of the ash. After this point, only oversized materials (e.g., mufflers, washing machines, propane cylinders, etc.) and magnetically separated ferrous metals are removed. The remaining ash is then eventually shipped to a landfill site for disposal.

It is highly desirable therefore to remove as much of the moisture as possible before the physical separation steps. An ideal location is at the place where all the ash is first gathered, the ash extractor. However, with its very high temperatures and high pH values, the ash extractor is a hostile environment for the use of conventional flocculant chemicals. It is thus an object of this invention to provide the art with a method for dewatering moisture laden ash within the ash extractor of a WTE plant.

DETAILED DESCRIPTION OF THE INVENTION

The method of the present invention consists of adding a dewatering agent to the ash in the ash extractor of a WTE facility. The dewatering agent consists of a copolymer and at least one nonionic surfactant.

The copolymer is made up of two monomeric repeat units. The first monomer is a vinyl monomer which is obtained after polymerization of an ethylenically unsaturated compound, preferably carboxylic acid or an amide form thereof. Such compounds include acrylic acid, methacrylic acid, acrylamide and maleic acid or its anhydride.

The second monomer is an acrylamido alkane sulfonic acid compound. These compounds are well known in the art and may be prepared by processes such as are disclosed in U.S. Pat. No. 3,506,707, incorporated herein by reference. An exemplary compound exhibiting the desired results in accordance with the method of the invention is 2-acrylamido-2-methylpropane sulfonic acid, or salt form thereof, commonly known as AMPS ®, commercially available from the Lubrizol corporation.

The copolymers of the present invention may comprise from about 3 to about 97%, by weight, and preferably from about 30 to about 70%, by weight, of the AMPS monomer and conversely, from about 97 to about 3% by weight and preferably from about 70 to about 30%, by weight, of the vinyl monomer.

The molecular weight for the copolymers of the invention can range rather extensively, for example, from about 1,000,000 to 10,000,000. For the use of the polymers as set forth herein, the preferable range is from about 5,000,000 to 10,000,000.

The nonionic surfactant is selected from the group of compounds consisting of primary alcohol ethoxylates, secondary alcohol ethoxylates and alkyl phenol ethoxylates. Exemplary primary alcohol ethoxylates are those compounds commercially available from Shell Chemical under the Neodol ® series of products and from Henkel Corp., under the Trycol trade name. The secondary alcohol ethoxylates are Commercially available products and may be acquired from Union Carbide under the Tergitol$^R$ 15-S series of products. The alkylphenol ethoxylate compounds are preferably those having from about 1 to about 10 moles of ethoxylation, such as the Surfonic ® series available commercially from Texaco and the Triton ® series available from Rohm and Haas.

The two components of the dewatering agent of the present invention may be combined together in the same aqueous solution prior to being administered to the ash or they may be formulated into separate aqueous solutions and applied separately. If separately, then they should be added to the ash substantially simultaneously.

The amount of the dewatering agent added is based upon the weight of the ash in the ash extractor. The amount of copolymer required is in the range of about .1 to 10 ppm, by weight, based on active copolymer. Preferably, 1.0 to 2.5 ppm is sufficient. The amount of the nonionic surfactant required based on either a single compound or the total of multiple compounds, is in the range of about 10 to 1000 ppm, by weight. The preferred range would be from about 50 to 150 ppm.

EXAMPLE

The following example is intended to be illustrative of the present invention. It should not be constituted as limiting the scope thereof.

A field trial was conducted of a WTE plant in the north-east. The plant has two 60,000 pound per hour steam boilers that are used to burn the trash. Ash generated from the combustion and gas cleaning operations (i.e., bottom ash, fly ash, and scrubber solids) is directed to the bottom of an extractor (one per boiler). The ash is partially dewatered by a hydraulic ram that pushes the wet mass up an inclined ramp. The partially dewatered ash is then conveyed to a "grizzly" where large metal objects (e.g., mufflers, washing machines, propane cylinders, etc.) are separated. Ash passing through the grizzly is directed to a magnetic separator to remove ferrous metals. The oversized and magnetically separated metal objects are combined and sent to a recycling facility. The remaining undersized ash (devoid of ferrous metal content) is stored in an enclosed shed before being hauled to a local landfill.

The trial was carried out in two phases. The first phase covered eleven days of operation and was used to establish base line values. During the second phase, covering five days, the dewatering treatment of the invention was administered.

The object of the invention, of course, is to reduce the moisture content of the non-combustible material. Moisture reduction was determined by calculating the percentage of non-combustibles generated by the plant during the trial period and comparing that value to the percentage of non-combustibles the plant generated during the base line period. The percentage of non-combustibles (% refuse) was determined according to the following formula:

$$\% \text{ refuse} = \frac{\text{weight of ash + weight of metal}}{\text{weight of trash}} \times 100$$

During the base line and trial periods, the WTE plant processed an average of 430 tons of trash per day. The percentage of untreated non-combustibles (% refuse) for the baseline period was 29.43%.

For the trial period, the following dewatering treatment formulation was administered directly to the ash extractor.

| Treatment | Concentration |
| --- | --- |
| Non-ionic surfactant* | 100 ppm |
| Copolymer** | 1.8 ppm |

Active ingredients:
*Nonionic surfactant = An aqueous blend of:
- Secondary alcohol (7 mole) ethoxylate (Tergitol 15-S-7) - 15%
- Primary alcohol (6 mole) ethoxylate (Neodol 91-6) - 5%
- Tridecyl alcohol ethoxylate (Trycol 5941) - 1%
**Copolymer = 50/50 AMPS/acrylamide copolymer as a .2% aqueous solution During the trial period, the percentage of refuse leaving the plant was 23.42%. This is a reduction of 6.01% in the weight of refuse leaving the plant which is brought about by a reduction in the moisture content of the non-combustible material.

The plant generates approximately 40,000 tons of ash per year. With ash disposal costs currently at $96/ton, this plant spends about $3,800,000/year just to dispose of its ash. Therefore, a 1% reduction in the weight of ash saves about $38,000/year in disposal costs. Based on the results of this trial, this plant can realize annual savings in the vicinity of $228,000. This represents a significant cost savings for any municipality under ever constant budget constraints.

While this invention has been described with respect to a particular embodiment thereof, it is apparent that numerous other forms and modifications of the invention will be obvious to those skilled in the art. The appended claims and this invention generally should be construed to cover all such obvious forms and modifications which are within the true spirit and scope of the present invention.

I claim:

1. A method for dewatering the ash collected in an ash extractor which is generated during the combustion of municipal solid waste comprising partially dewatering the ash by mechanical means and adding to the ash from about 0.1 to 10 ppm, by weight, of a copolymer comprising repeat units of from about 3 to 97%, by weight, of an ethylenically unsaturated compound and from about 97 to 3%, by weight, of 2-acrylamido-2-methyl propane sulfonic acid wherein the molecular weight of the copolymer is from about 5,000,000 to about 10,000,000, and from about 10 to about 1000 ppm, by weight, of at least one surfactant selected from the group consisting of primary alcohol ethoxylates, secondary alcohol ethoxylates and alkylphenol ethoxylates; wherein said ethylenically unsaturated compound is selected from the group consisting of acrylic acid, methacrylic acid, acrylamide, maleic acid and maleic anhydride.

2. The method of claim 1 wherein the solid waste is burned in a waste to energy facility.

3. The method of claim 1 wherein the ash consists of bottom ash.

4. The method of claim 1 wherein the ash consists of fly ash.

5. The method of claim 1 wherein the amount of copolymer added to the ash is from about 1.0 to about 2.5 ppm, by weight.

6. The method of claim 1 wherein the amount of nonionic surfactant added to the ash is from about 50 to about 150 ppm, by weight.

* * * * *